US011182494B2

(12) United States Patent
Hawkins et al.

(10) Patent No.: US 11,182,494 B2
(45) Date of Patent: Nov. 23, 2021

(54) PROCESSING DATA ON AN ELECTRONIC DEVICE

(71) Applicant: BlackBerry Limited, Waterloo (CA)

(72) Inventors: Siavash James Joorabchian Hawkins, Tonbridge (GB); Phillip Riscombe-Burton, London (GB); Johnathan George White, St. Albans (GB)

(73) Assignee: BlackBerry Limited, Waterloo (CA)

(*) Notice: Subject to any disclaimer, the term of this patent is extended or adjusted under 35 U.S.C. 154(b) by 323 days.

(21) Appl. No.: 16/582,930

(22) Filed: Sep. 25, 2019

(65) Prior Publication Data

US 2020/0104517 A1  Apr. 2, 2020

(30) Foreign Application Priority Data

Sep. 28, 2018  (EP) .................................... 18197811

(51) Int. Cl.
*G06F 21/62* (2013.01)
*H04L 9/08* (2006.01)
(Continued)

(52) U.S. Cl.
CPC ............ *G06F 21/62* (2013.01); *H04L 9/0841* (2013.01); *H04L 9/3263* (2013.01);
(Continued)

(58) Field of Classification Search
CPC ...................................................... G06F 21/62
See application file for complete search history.

(56) References Cited

U.S. PATENT DOCUMENTS 9,104,889 B1* 8/2015 Kiswani ................ H04W 12/04
2005/0063544 A1* 3/2005 Uusitalo ............... H04L 63/306
380/277
(Continued)

FOREIGN PATENT DOCUMENTS

DE  19925389 A1  12/2000
DE  10240845 A1  6/2004
(Continued)

OTHER PUBLICATIONS

European Extended Search Report; Application No. 18197811.5; dated Mar. 15, 2019; 5 pages.

*Primary Examiner* — Ponnoreay Pich
(74) *Attorney, Agent, or Firm* — Conley Rose, P. C.; J. Robert Brown, Jr.

(57) ABSTRACT

A method of controlling access to data on a first electronic device, the method comprising steps of establishing a shared encryption key with a first software application instance running on a second electronic device, receiving a 'begin session' command sent by the first software application instance and responsive to the 'begin session' command, creating a storage location in a data store of the electronic device, obtaining a data encryption key, receiving data, encrypting the data using the data encryption key and storing the encrypted data in the storage location, receiving an 'end session' command sent by the first software application instance and responsive to the 'end session' command, discarding the shared encryption key, and deleting the encrypted data from the storage location.

16 Claims, 7 Drawing Sheets

(51) Int. Cl.
*H04L 9/32* (2006.01)
*H04W 12/033* (2021.01)
*H04W 12/062* (2021.01)

(52) U.S. Cl.
CPC ......... *H04L 9/3273* (2013.01); *H04W 12/033* (2021.01); *H04W 12/062* (2021.01)

(56) References Cited

U.S. PATENT DOCUMENTS

2009/0296938 A1\* 12/2009 Devanand ............. H04L 9/0631
380/278
2014/0007048 A1 1/2014 Qureshi et al.
2020/0104517 A1\* 4/2020 Hawkins ............. H04W 12/062

FOREIGN PATENT DOCUMENTS

EP 3629204 A1 \* 4/2020 ........... H04L 9/0841
EP 3629204 B1 \* 2/2021 ........... H04L 9/0841
WO 2016100095 A1 6/2016

\* cited by examiner

PROCESSING DATA ON AN ELECTRONIC DEVICE

CROSS-REFERENCE TO RELATED APPLICATIONS

This application claims priority to European Application No. 18197811.5 filed Sep. 28, 2018 by Siavash James Joorabchian Hawkins, et al. entitled, "Processing Data on an Electronic Device", which is incorporated by reference herein as if reproduced in its entirety.

FIELD OF TECHNOLOGY

The present disclosure relates to a method of processing data on an electronic device and a method of controlling processing of data on an electronic device. The present disclosure further relates to an electronic device.

BACKGROUND

Enterprise software applications running on mobile electronic devices are often configured to provide security features including end-to-end encryption of data in transit between mobile devices and application servers, secure storage of enterprise data at rest on the mobile device, and enforcement of password and device compliance policies in order to access enterprise data. The Blackberry Dynamics platform is an example of enterprise software that enables secure storage of enterprise data on a mobile device used by an end user.

Improvements in secure storage of enterprise data on enterprise electronic devices used by multiple users are desirable.

SUMMARY

Accordingly, there is provided methods, a computer program and an electronic device as detailed in the claims that follow.

BRIEF DESCRIPTION OF THE DRAWINGS

Embodiments of the present disclosure will now be described, by way of example only, with reference to the attached figures, in which.

DETAILED DESCRIPTION

Figure 1:
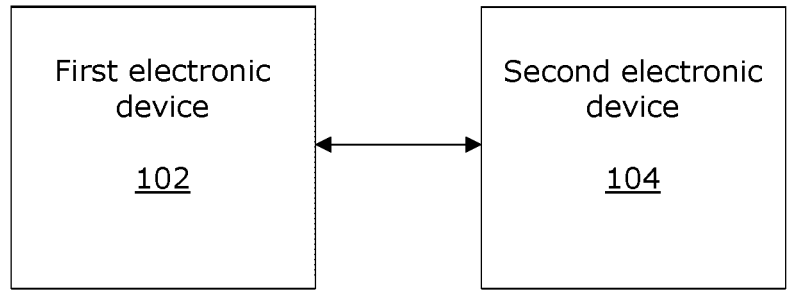
FIG. 1 is a schematic representation of a network in accordance with the present disclosure.

The following describes an electronic device, a method of processing data on an electronic device and a method of controlling processing of data on an electronic device.

The method of processing data on an electronic device includes a step of establishing a shared encryption key with a first software application instance running on a second electronic device. The method further includes a step of receiving a 'begin session' command sent by the first software application instance. The method further includes steps responsive to the 'begin session' command, of: creating a storage location in a data store of the electronic device; and obtaining a data encryption key. The method further includes steps of receiving data, encrypting the data using the data encryption key and storing the encrypted data in the storage location. The method further includes a step of receiving an 'end session' command sent by the first software application instance. The method further includes steps responsive to the 'end session' command, of: discarding the shared encryption key; and deleting the encrypted data from the storage location.

The method of controlling processing of data on an electronic device includes a step of establishing a shared encryption key with the electronic device. The method further includes a step of sending a 'begin session' command to the electronic device, to cause the electronic device to create a storage location in a data store of the electronic device and obtain a data encryption key. The method further includes a step of sending an 'end session' command to the electronic device, to cause the electronic device to discard the shared encryption key and delete the encrypted data from the storage location.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 is a schematic diagram showing a network comprising a first electronic device 102 and a second electronic device 104, according to an implementation. The second electronic device 104 is configured to control processing of data on the first electronic device 102 according to an implementation.

Figure 2:
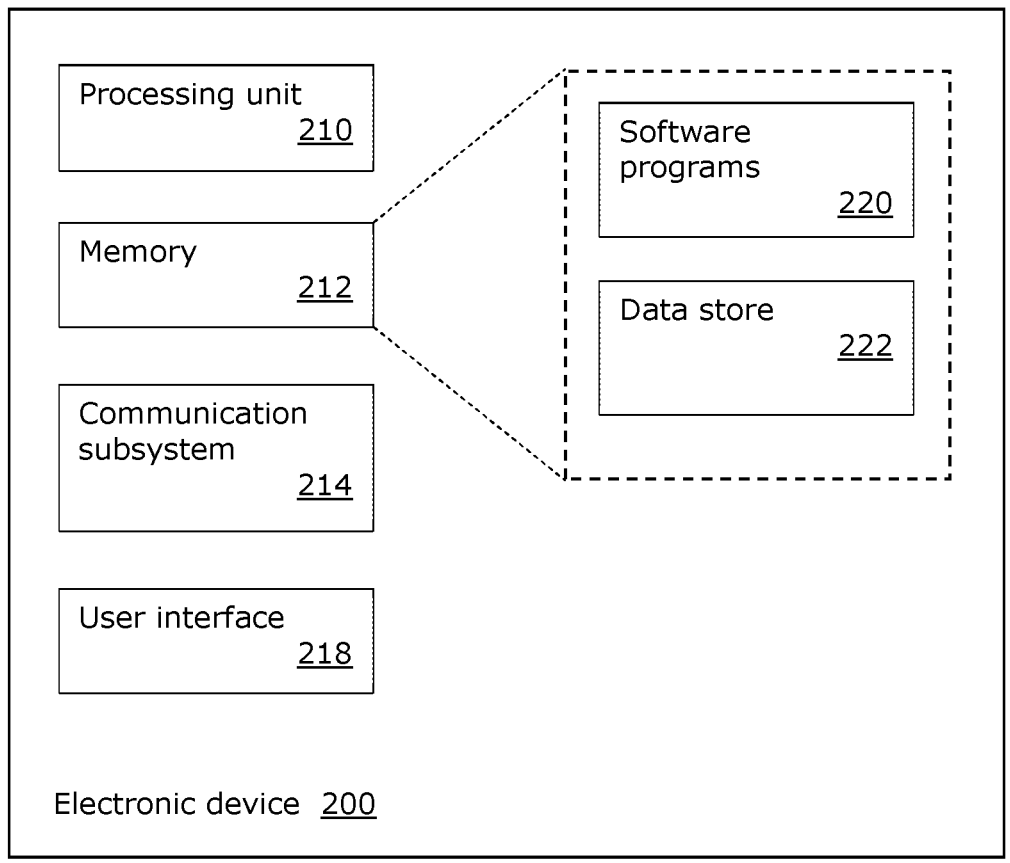
FIG. 2 is a block diagram of an electronic device in accordance with the present disclosure.

FIG. 2 is a schematic diagram showing an electronic device 200 that can be the first electronic device 102 or the second electronic device 104 according to an implementation. The electronic device 200 includes a processing unit 210, a communication subsystem 214 and a memory 212. The electronic device 200 may also include a user interface 218. An electronic device may include additional, different, or fewer features, as appropriate.

The example communication subsystem 214 can be configured to provide wireless or wireline communication for data or control information provided by the processing unit 210. The communication subsystem 214 can include, for example, one or more antennas, a receiver, a transmitter, a local oscillator, a mixer, and a digital signal processing (DSP) unit. In some implementations, the communication subsystem 214 can support multiple input multiple output (MIMO) transmissions. In some implementations, the receivers in the communication subsystem 214 can be an advanced receiver or a baseline receiver. Two receivers can be implemented with identical, similar, or different receiver processing algorithms.

The example processing unit 210 can include one or more processing components (alternatively referred to as "processors" or "central processing units" (CPUs)) configured to execute instructions related to one or more of the processes, steps, or actions described above, in connection with one or more of the implementations disclosed herein. In some implementations, the processing unit 210 can be configured to generate control information, such as a measurement report, or respond to received information, such as control information from a network node. In some cases, the processing unit 210 can also be configured to make a radio resource management (RRM) decision, such as cell selection/reselection information, or trigger a measurement report. The processing unit 210 can also include other auxiliary components, such as random access memory (RAM) and read-only memory (ROM).

If the electronic device includes a user interface 218, the example user interface 218 can include, for example, any of the following: one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. FIG. 2 and associated descriptions provide additional details of these implementations.

The example memory 212 can be a computer-readable storage medium on the electronic device 202. Examples of the memory 212 include volatile and non-volatile memory, magnetic media, optical media, random access memory (RAM), read-only memory (ROM), removable media, and others. The memory 212 can store an operating system (OS) of electronic device 202 and various other computer-executable software programs for performing one or more of the processes, steps, or actions described above.

As shown in FIG. 2, the example memory 212 can include one or more software programs 220. The software programs 220 include applications, programs, modules, scripts, processes, or other objects that can execute on the electronic device 200. For example, software programs 220 can include the operation system (OS) executing on the electronic device 200, firmware of the electronic device 200, enterprise or personal software applications installed on the electronic device 200. The example memory can include a data store 222.

The processing unit 210 can be configured to run one or more instances of a software application installed on the electronic device.

Turning to a general description, the first electronic device 102, e.g., the electronic device 200, may include, without limitation, any one or more of the following: computing device, mobile device, mobile electronic device, user device, mobile station, subscriber station, portable electronic device, mobile communications device, wireless modem, wireless terminal, television, printer or other peripheral, vehicle, electronic appliance, Internet of Things (IoT) device or any other electronic device capable of sending and receiving data. Examples of an IoT device include, without limitation, any one or more of the following: a measuring device, a display device, an electronic white board, a smart television, a webcam, a video conferencing device and so forth. An individual physical device in the scope of the Internet of Things is referred to as an Internet of Things device, sometimes also known as an Internet of Things resource.

The first electronic device 102 can be any physical device that has some computing power. In an example, the first electronic device can be an IoT device that does not include a user interface but is instead configured via a web page installed on the IoT device; the IoT device can be connected to a local area network, such as a Wi-Fi network, and the web page accessed by another electronic device, such as a mobile device or a computing device. The first electronic device may be an electronic device that can be used by one user and then another user, i.e. serial users, and can be stored in between uses, i.e. not necessarily passed directly from one user to another. For example, a smart surveying Geiger counter that is used by one person for a time and is then passed to another user when the first person has finished with it. The first electronic device may alternatively be an electronic device that can be used by multiple concurrent users. For example, a conference room presentation manager device could be used by any person in the conference room, each of whom would be a user.

The second electronic device 104 can be, without limitation, any one or more of the following: computing device, mobile device, mobile electronic device, user device, mobile station, subscriber station, portable electronic device, mobile communications device, wireless modem, wireless terminal, television, printer or other peripheral, vehicle, electronic appliance, or any other electronic device capable of sending and receiving data. Examples of a mobile device may include, without limitation, any one or more of the following: a cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Figure 3:
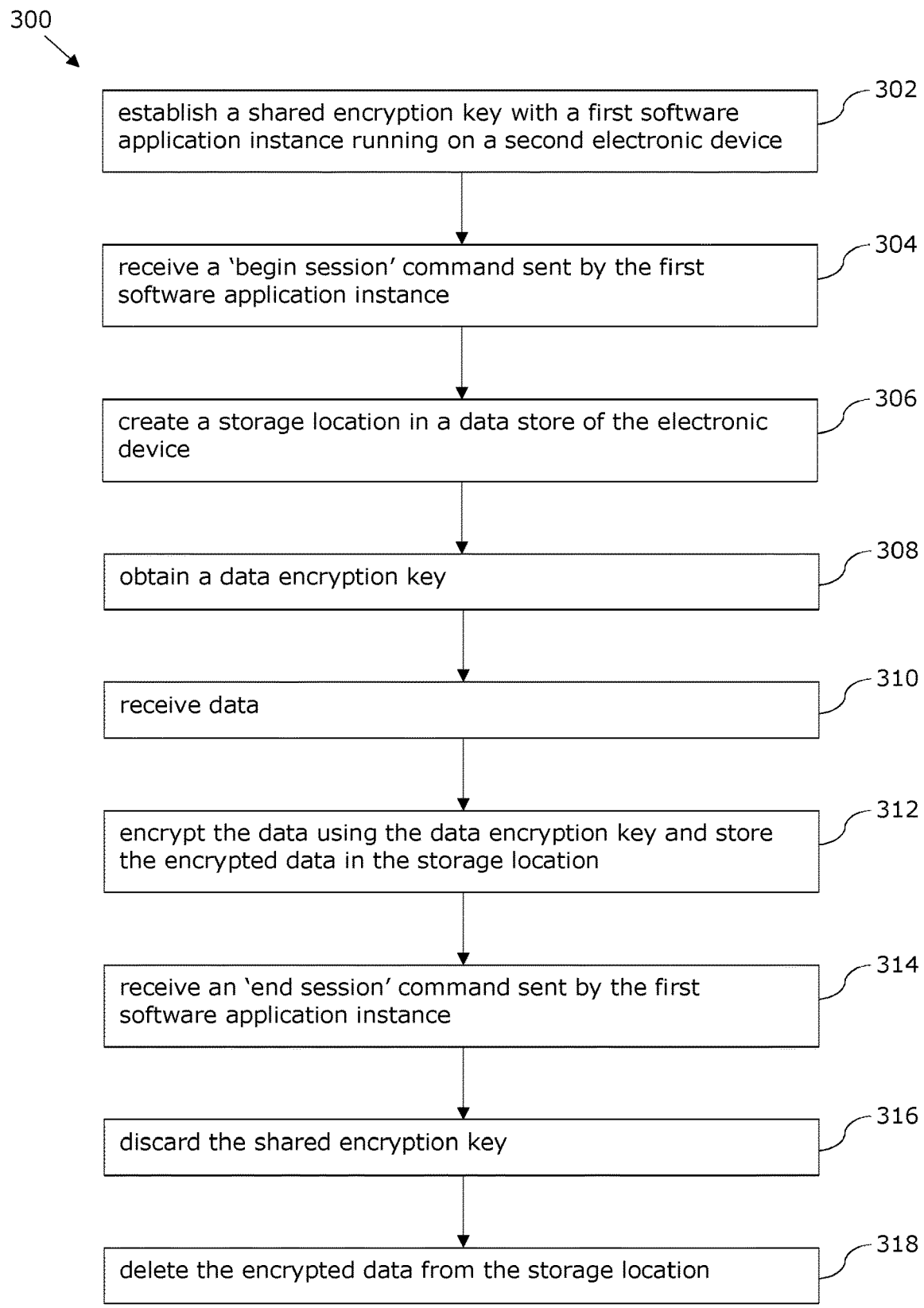
FIG. 3 is a flowchart illustrating a method of processing data on an electronic device in accordance with the present disclosure.

FIG. 3 is a flow diagram showing an example process 300 of processing data on an electronic device. The process 300 can be implemented by, for example, the first electronic device 102 shown in FIG. 1. The process 300 shown in FIG. 3 can also be implemented using additional, fewer, or different entities. Furthermore, the process 300 shown in FIG. 3 can also be implemented using additional, fewer, or different operations, which can be performed in the order shown or in a different order.

The example process 300 begins at 302, establishing a shared encryption key with a first software application instance running on a second electronic device, for example the second electronic device 104 shown in FIG. 1. The process includes receiving 304 a 'begin session' command sent by the first software application instance running on the second electronic device. Responsive to the 'begin session' command, the process includes creating 306 a storage location in a data store of the electronic device and obtaining 308 a data encryption key. The process includes receiving 310 data, encrypting 312 the data using the data encryption key and storing 312 the encrypted data in the storage location. The process includes receiving 314 an 'end session' command sent by the first software application instance. Responsive to the 'end session' command, the process includes discarding 316 the shared encryption key and deleting 318 the encrypted data from the storage location.

Figure 4:
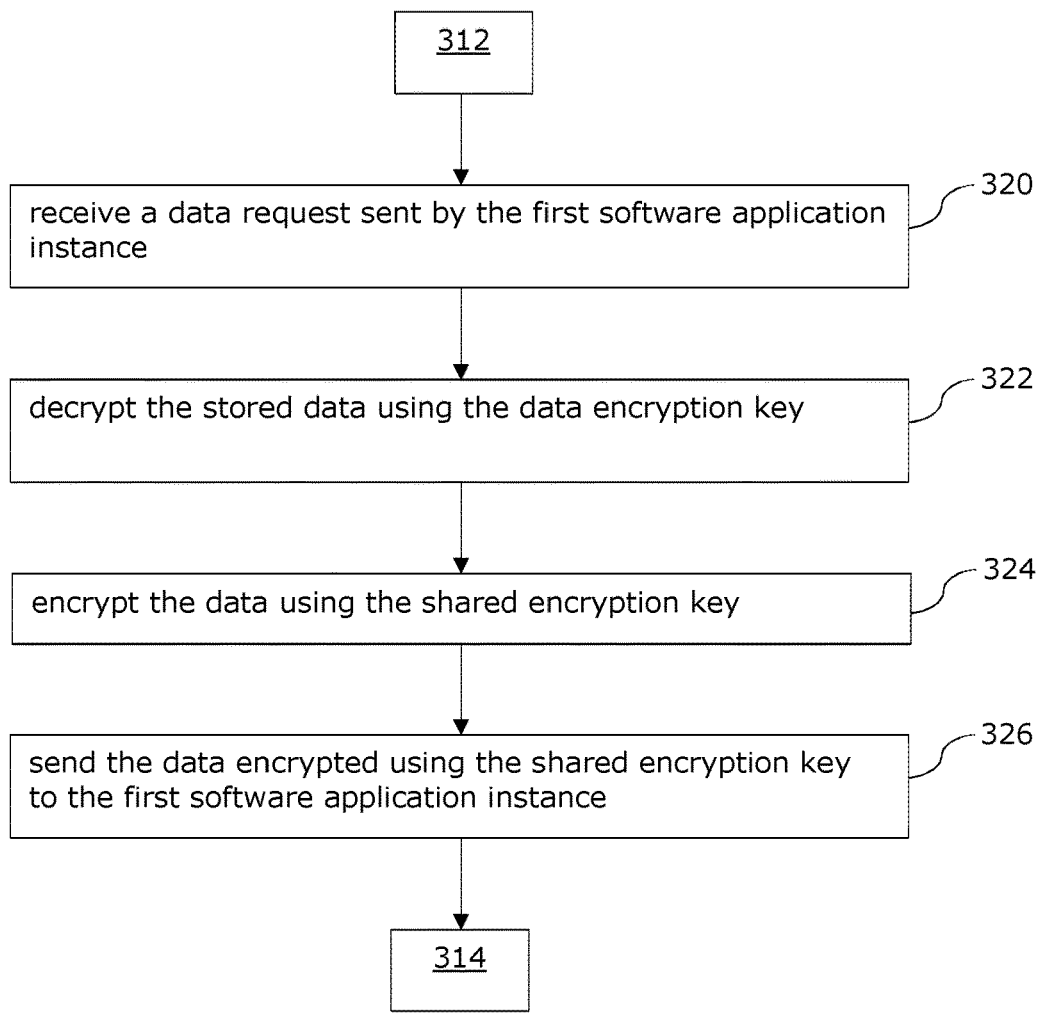
FIG. 4 is a flowchart illustrating further steps a method of processing data on an electronic device in accordance with the present disclosure.

FIG. 4 is a flow diagram showing additional steps of an example process of processing data on an electronic device. In this example, the process 300 includes receiving 320 a data request sent by the first software application instance. The process proceeds to 322, decrypting the stored data using the data encryption key, and 324, encrypting the data using the shared encryption key. The process proceeds to 326, sending the data encrypted using the shared encryption key to the first software application instance on the second electronic device 104.

The example processes illustrated in FIGS. 3 and 4 can include further steps, for enabling a second software application instance to obtain access to the data, encrypted with the data encryption key, that is stored in the storage location of the electronic device. The second software application instance may also run on the second electronic device 104 or may run on a third electronic device, such as the electronic device 200 shown in FIG. 2.

The further steps include creating a file containing the data encryption key, encrypting the file using a second shared encryption key and storing the encrypted file in the data store. The second shared encryption key can then be provided to the second application instance, to enable the second application instance to obtain the data encryption key and thus be able to access the data, as will be described in further detail below.

The data received in the example processes illustrated in FIGS. 3 and 4 can be received from a software application running on the electronic device. For example, the electronic device might be a smart Geiger counter and the data might be measurement data received from a software application for making or recording measurements of ionizing radiation. Or the electronic device might be a conference room presentation manager device and the data might be audio-video data received from a video conferencing software application.

Alternatively, the data received in the example processes illustrated in FIGS. 3 and 4 can be received from a software application running on another electronic device. For example, a physical device having limited computing power or with limited programmable storage, which is capable of generating data, but not capable of one or more of establishing a shared encryption key, encrypting and storing the data, or implementing all of the steps of the example process illustrated in FIGS. 3 and 4. In such an example, the electronic device, i.e. the first electronic device 102 in FIG. 1, performs as a local hub and the other electronic device is communicatively connected to the first electronic device to send data to the first electronic device for secure storage.

Figure 5:
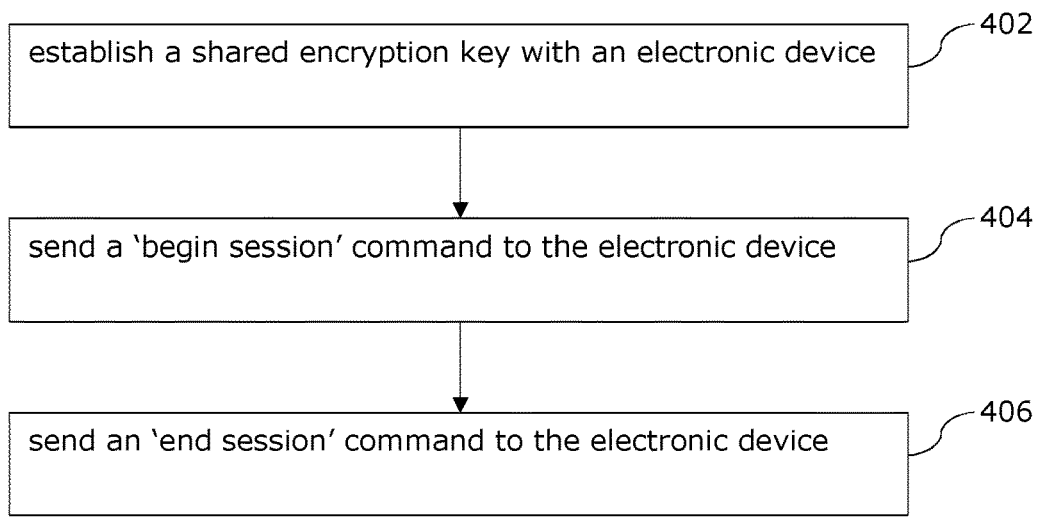
FIGS. 5 and 6 are flowcharts illustrating methods of controlling processing of data on an electronic device in accordance with the present disclosure.

FIG. 5 is a flow diagram showing an example process 400 of controlling processing of data on an electronic device. The process 400 can be implemented by, for example, the second electronic device 104 shown in FIG. 1. The process 400 shown in FIG. 5 can also be implemented using additional, fewer, or different entities. Furthermore, the process 400 shown in FIG. 5 can also be implemented using additional, fewer, or different operations, which can be performed in the order shown or in a different order.

The example process 400 begins at 402, establishing a shared encryption key with an electronic device, for example the first electronic device 102 in FIG. 1. The process includes sending 404 a 'begin session' command to the electronic device. The 'begin session' command is configured to cause the electronic device to create a storage location in a data store of the electronic device and to obtain a data encryption key, as described above with reference to FIGS. 3 and 4. The process includes sending 406 an 'end session' command to the electronic device. The 'end session' command is configured to cause the electronic device to discard the shared encryption key and delete the encrypted data from the storage location, as described above with reference to FIGS. 3 and 4.

Figure 6:
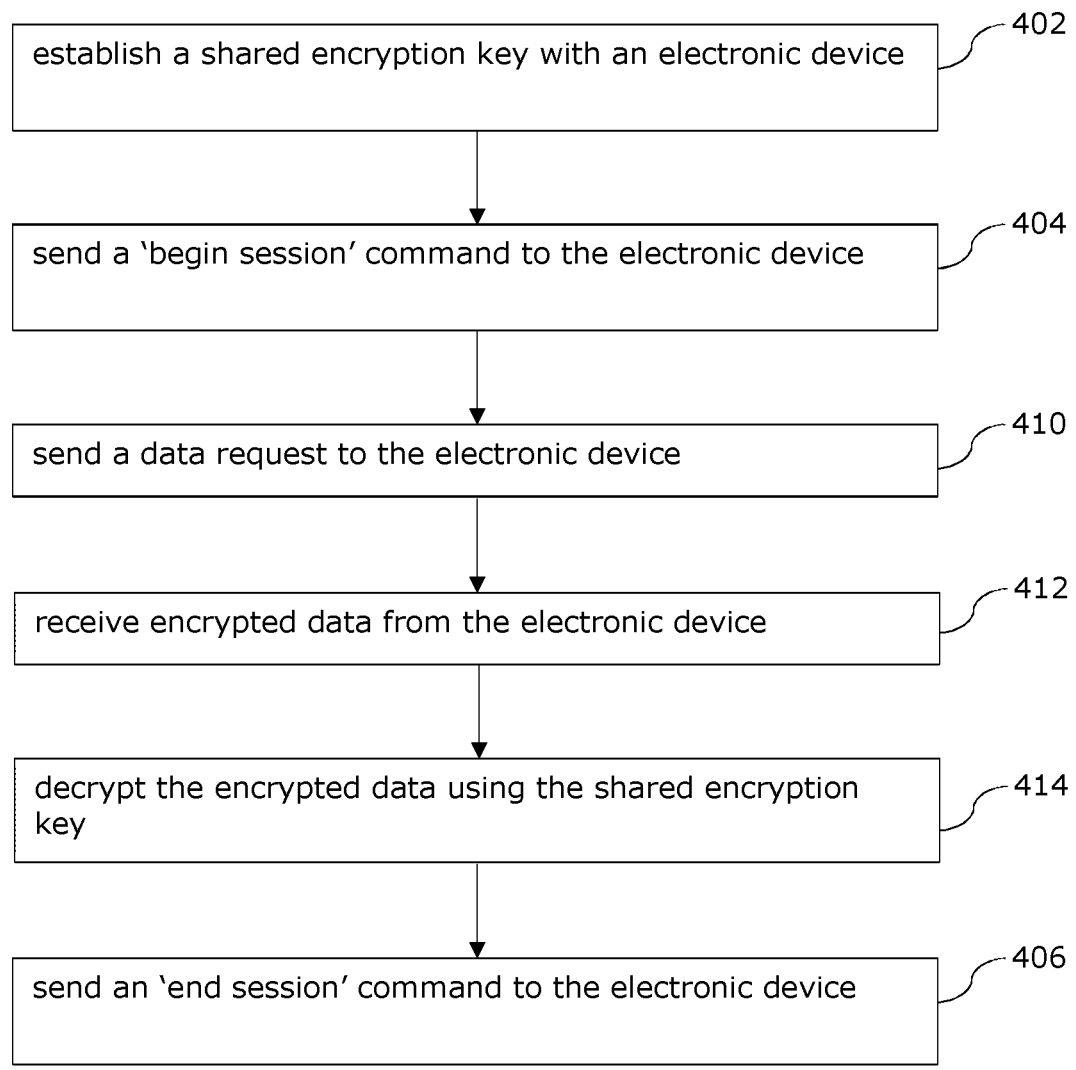

FIG. 6 is a flow diagram showing an example process 400 of controlling processing of data on an electronic device. In this example, the process 400 includes sending 410 a data request to the electronic device. The process further includes receiving 412 encrypted data from the electronic device and decrypting 414 the encrypted data using the shared encryption key.

The example processes illustrated in FIGS. 5 and 6 can be performed by a first software application instance running on a second electronic device, for example the second electronic device 104 shown in FIG. 1. A second application instance can be provided, which can also run on the second electronic device or which can run on a third electronic device, such as the electronic device 200 shown in FIG. 2. In this example, the process 400 includes the second application instance establishing a second shared encryption key with the electronic device, for example the first electronic device 102 of FIG. 1. The process 400 also includes the second application instance using the second shared encryption key to obtain access to a data encryption key on the electronic device.

In an example, the second application instance can use the second shared encryption key to obtain access to a file on the electronic device containing the data encryption key. The second application instance is thus able to obtain the data encryption key and thereby obtain access to data, encrypted with the data encryption key, that is stored in the storage location of the electronic device.

Figure 7:
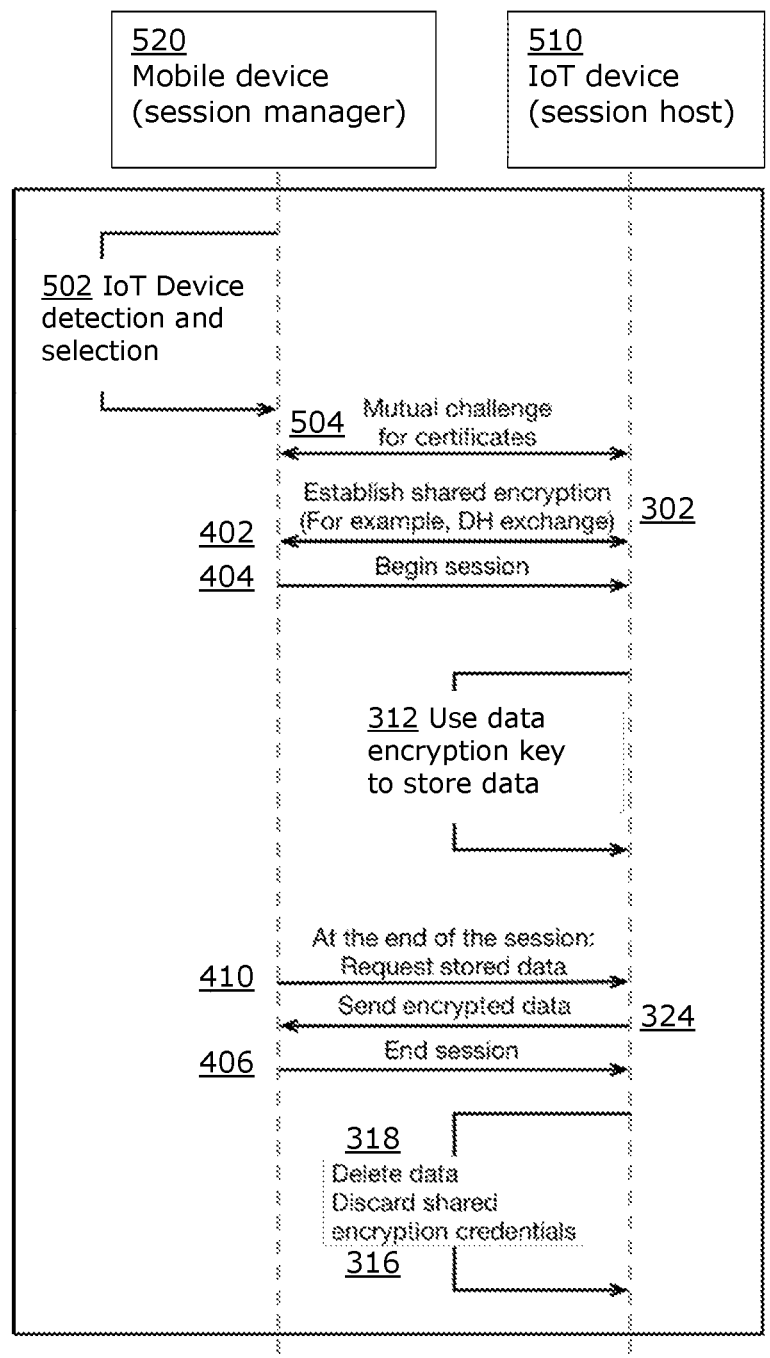
FIG. 7 is a signaling diagram illustrating a method of processing data on an electronic device and a method of controlling processing of data on the electronic device in accordance with the present disclosure.

FIG. 7 is a signaling diagram showing signaling between an electronic device and a second electronic device. In this example, the electronic device is an Internet of Things, IoT, device 510 running an instance of a software application configured to implement the method of processing data on an electronic device, as described above with reference to FIGS. 3 and 4. The software application instance running on the electronic device is referred to herein as the session host.

The second electronic device is a mobile electronic device, 520, running an instance of a software application configured to implement the method of controlling processing of data on an electronic device, as described above with reference to FIGS. 5 and 6. The software application instance running on the second electronic device is referred to herein as the session manager.

The IoT device 510 and the second electronic device 520 have been configured in advance for authentication by electronic certificates being installed. The IoT device 510 has an electronic certificate in its data store that has been signed by an enterprise certificate signing service. The session manager 520 has an electronic certificate that has also been signed by the enterprise certificate signing service.

The mobile device 520 performs detection and selection of the IoT device 510. The mobile device 520 sets up native communication between the session manager and the IoT device 510. This communication could use Wi-Fi, Bluetooth, Near Field Communication (NFC) or any other technology supported by both the IoT device and the mobile device.

The session manager 520 and the session host 510 set up a secure communication channel. This includes at least mutual challenges 504 for certificates, for authentication. The purpose of the mutual challenge for certificates is to authenticate the IoT device 510 as having been set up by the enterprise and the session manager as being run by a user that represents an enterprise that is allowed to utilise the IoT device.

Diffie-Hellman (DH) exchange or similar may be used to establish 302, 402 a first shared secret to be used as a shared encryption key. The DH exchange protects the communication but does not authenticate its end points; the certificate challenges is done to add authentication. The shared encryption key is stored persistently and securely by the session manager, in a data store of the mobile device. The shared encryption key is not stored by the session host on the IoT device 510. Subsequent communication between the session manager 520 and the session host 510 is sent via the secure communication channel.

The session manager sends 404 a 'begin session' command and the session host receives 304 the 'begin session' command. Responsive to receiving the 'begin session' command the session host creates a storage location in a data store of the electronic device. The steps of receiving the 'begin session' command and creating the storage location are referred to herein as creating a session container. Following creation of the session container, management data relating to the session container, such as policies and encryption keys needed for operation of the session container, are stored in the storage location. The session host may obtain a data encryption key, which is stored as part of the management data. The data encryption key is stored in an encrypted form, being at least encrypted by the shared encryption key.

Use of different types of encryption key may be desirable for the shared encryption key and the data encryption key because some types of encryption are more suited to data at rest and others are more suited to data in transit. Alternatively, the shared encryption key can be used as the data encryption key.

Data received by the session host during the session is encrypted 312 using the data encryption key and stored 312 in the storage location, i.e. within the session container. The data could, for example, be video and audio recording, if the resource is a webcam, or readings, if the resource is a smart Geiger counter.

The data store of the electronic device could be integrated in the IoT device (as illustrated in FIG. 2), external but physically attached to the IoT device, like a universal serial bus (USB) accessory, separate connected storage on a local area network, like a network-attached storage (NAS) server, or separate connected storage on the Internet, like a cloud storage service.

When an end user decides to end the session, an 'end session' command is sent 406 by the session manager to the session host. The point at which a user chooses to end a session depends on the IoT device and the context in which it is used. For example: in the context of a meeting, the session ends when the meeting ends; and in the case of a serial-user resource held in a common pool, such as a smart Geiger counter or a mobile computing device, the session ends when the resource is returned to the pool.

The session manager can send 410 a data request to the session host: Request stored data. The session host sends the data that it stored during the session to the session manager; the stored data is decrypted using the data encryption key and re-encrypted using the shared encryption key for transmission to the session manager. The session manager 520 then has an encrypted copy of the data from the session, which it can decrypt using the shared encryption key, still held in its data store.

The session manager sends 406 an 'end session' command to the session host. The session host then discards 316 its copy of the shared encryption key and deletes 318 the encrypted data that it stored during the session. Once the data is deleted the session container ceases to exist. The IoT device/session host now has no data from the session.

It might be the case that a user doesn't want the session data. For example, suppose a user started a video conference but one other party didn't join and the conference was terminated after a few minutes. In this case, the session manager doesn't request the stored data.

Figure 8:
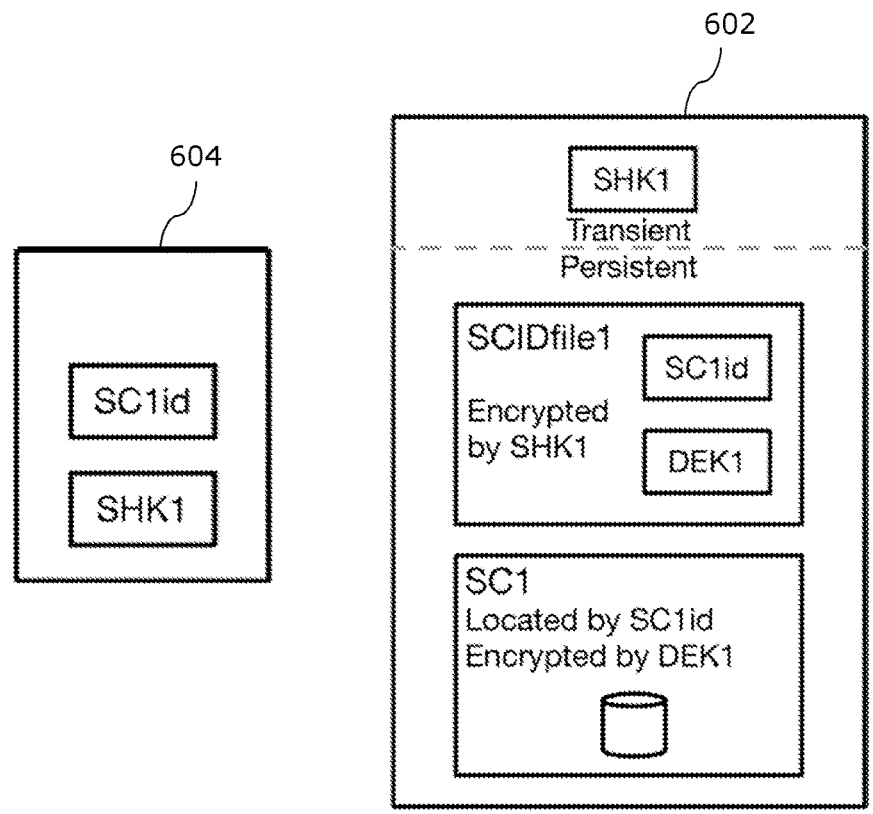
FIG. 8 is a schematic representation of a software application instance on a first electronic device and a first software application instance on a second electronic device in accordance with the present disclosure.
Figure 9:
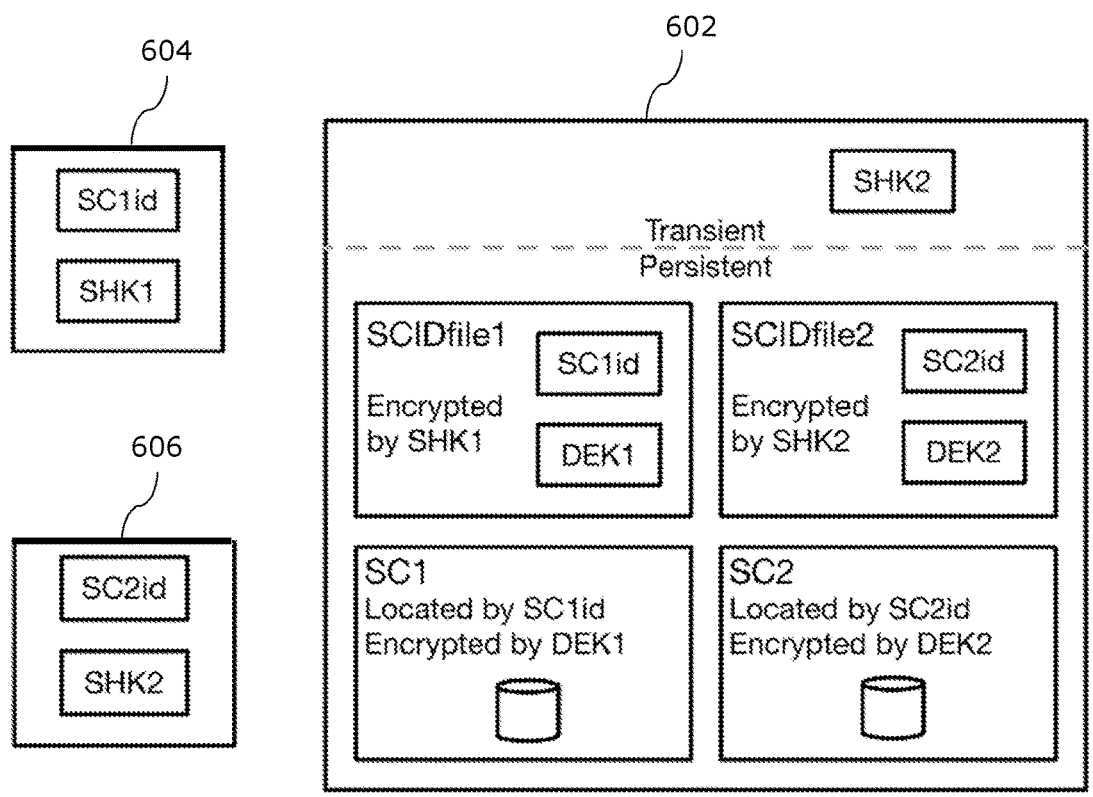
FIG. 9 is a schematic representation of a software application instance on a first electronic device and first and second software application instances on at least one second electronic device in accordance with the present disclosure.
Figure 10:
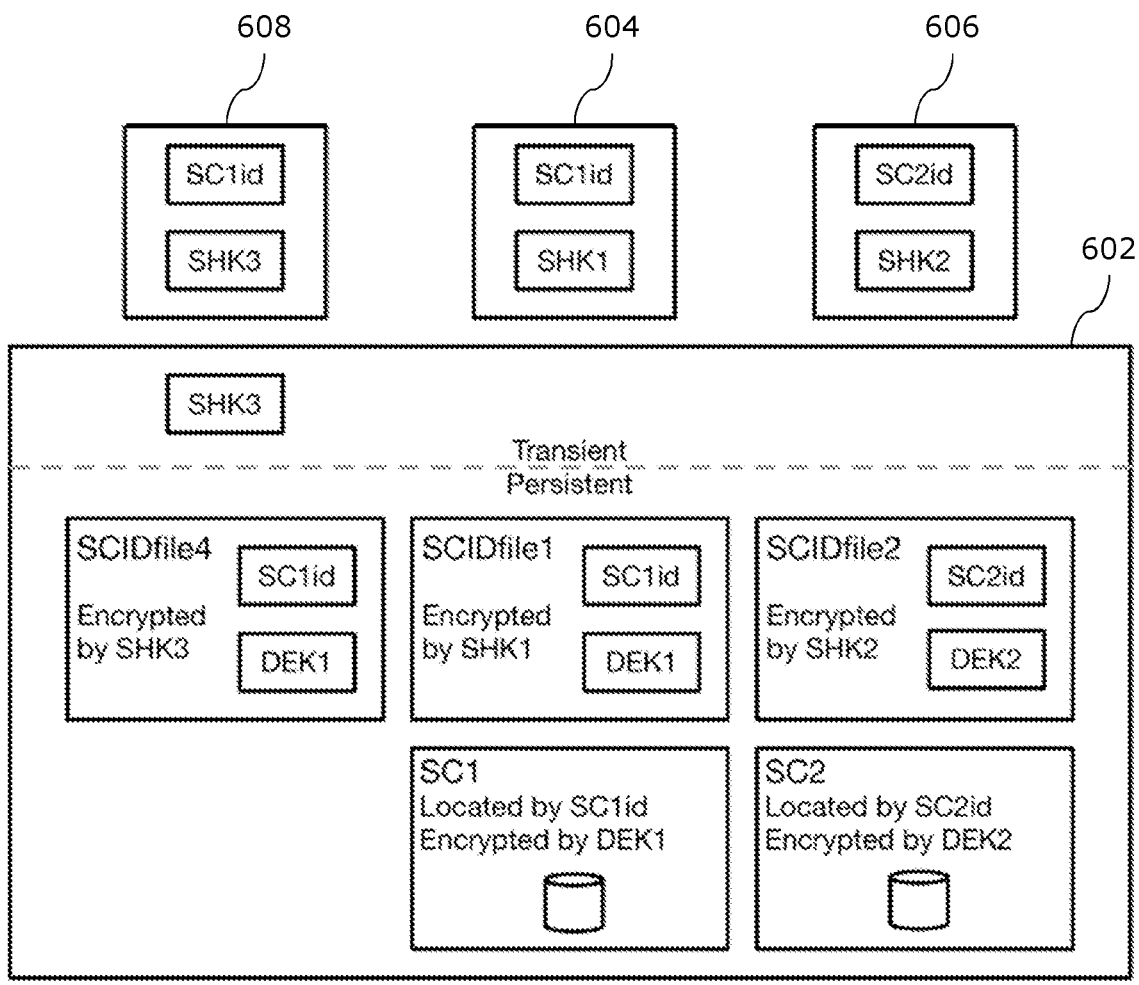
FIG. 10 is a schematic representation of a software application instance on a first electronic device and first, second and third software application instances on at least one second electronic device in accordance with the present disclosure.

FIGS. 8 to 10 illustrate implementation of the processes illustrated in FIGS. 3 and 4 and in FIGS. 5 and 6, to enable multiple software application instances to obtain access to the data, encrypted with the data encryption key, that is stored in the storage location of the electronic device, referred to herein as a shared session container.

Session containers can be shared by different end users, i.e. by different session managers, without any reduction in security of the stored data. This can be achieved by adding a number of message exchanges to the processes described above. FIGS. 8 to 10 illustrate various stages in the process of sharing a session container, SC1.

Referring to FIG. 8, an end user, User1, creates a first session container, SC1, on an electronic device, running a session host 602. User1 is running a session manager, SM1, 604 on a second electronic device. The session host 602 performs steps of: establishing a shared encryption key, SHK1, with SM1; generating a random identifier, SC1$id$, for SC1; generating a long random data encryption key, DEK1; and creating a session container ID file, SCIDFile1, containing SC1$id$ and DEK1. SCIDFile1 is then stored encrypted by SHK1 in the data store of the electronic device. The session host 602 sends SC1$id$ to SM1 604.

The following have therefore been stored in persistent storage of the data store of the electronic device: SCIDFile1, encrypted by SHK1; and session container data, SC1data, encrypted by DEK1. The session host holds SHK1 in transient storage only.

Referring to FIG. 9, another end user, User2, creates a second session container, SC2, on the electronic device. The second session container is created by a different session manager, SM2, 606 which can be running on the second electronic device or on a third electronic device. SM2 does not have SHK1, which means that SCIDFile1 cannot be decrypted by SM2.

The session host 602 performs steps of: establishing a second shared encryption key, SHK2, with SM2; generating a second random identifier, SC2$id$, for SC2; generating a second long random data encryption key, DEK2; and creating a second session container ID file, SCIDFile2, containing SC2$id$ and DEK2. The session host sends SC2$id$ to SM2.

The following have therefore now been stored in the persistent storage of the data store of the electronic device: SCIDFile1 encrypted by SHK1, containing SC1$id$ and DEK1; SCIDFile2 encrypted by SHK2, containing SC2id and DEK2; SC1data encrypted by DEK1; and second container data, SC2data, encrypted by DEK2. The session host 602 holds SHK2 in transient storage only.

When User1 wants to resume their session, SM1 604 sends a 'resume' command to the session host 602, with the following parameters: SHK1; SC1id. It will be understood that the 'resume' command would be sent via an established secure communication channel.

The session host 602 attempts to decrypt each of the SCID files in its data store using SHK1, but can only decrypt SCIDFile1. The session host checks if any decrypted SCID file contains the supplied session container identifier. SCIDFile1 contains SC1id, so the check is passed. The session host then obtains DEK1 from SCIDFile1. Access to SC1 by SM1 can now resume.

In an example, User1 wants to share SC1 with another end user, User3; User3 has their own session manager, SM3 608 which can be running on the second electronic device, on a third electronic device or on a fourth electronic device. SM1 first resumes SC1, as described above. SM1 and the session host 602 establish a transient shared encryption key, TSK1. The session host creates a temporary SCID file, SCIDFile3, containing SCID1 and DEK1, and stores SCIDFile3 encrypted with TSK1.

SM1 and SM3 establish a secure communication channel, and SM1 sends SCID1 and TSK1 to SM3. SM1 604 then suspends the session host 602.

SM3 establishes a secure communication channel with the session host 602, including establishing a third shared encryption key, SHK3. SM3 then sends a 'resume' command to the session host 602, with the parameters TSK1 and SC1id. The session host processes the resume command as described above. This time, the session host decrypts SCIDFile3 and obtains DEK1.

The session host 602 creates a new SCID file, SCIDFile4, containing SC1id and DEK1, and stores SCIDFile4 encrypted with SHK3. SCIDFile3 can now be deleted.

The following have therefore now been stored in the persistent storage of the data store of the electronic device: SCIDFile1 encrypted by SHK1, containing SC1id and DEK1; SCIDFile2 encrypted by SHK2, containing SC2id and DEK2; SCIDFile4 encrypted by SHK3, containing SC1id and DEK1; SC1data encrypted by DEK1; and second container data, SC2data, encrypted by DEK2. The session host holds SHK3 in transient storage only.

Every SCID file is stored on the session host 602 encrypted with the shared encryption key whose identifiers are stored in it. The data encryption keys, DEK1 and DEK2, never leave the session host. At least one shared encryption key is required to read any session container identifier. Session container identifiers can be like paths in the session host's file system.

The scope of the claims should not be limited by the preferred embodiments set forth in the examples, but should be given the broadest interpretation consistent with the description as a whole.

What is claimed is:

1. A method of processing data on an electronic device, the method comprising steps of:
    establishing a shared encryption key with a first software application instance running on a second electronic device;
    receiving a 'begin session' command sent by the first software application instance and responsive to the 'begin session' command:
        creating a storage location in a data store of the electronic device; and
        obtaining a data encryption key;
    receiving data;
    encrypting the data using the data encryption key and storing the encrypted data in the storage location;
    receiving an 'end session' command sent by the first software application instance and responsive to the 'end session' command:
        discarding the shared encryption key; and
        deleting the encrypted data from the storage location.

2. The method according to claim 1, further comprising steps of:
    receiving a data request sent by the first software application instance;
    decrypting the stored data using the data encryption key;
    encrypting the data using the shared encryption key; and
    sending the data encrypted using the shared encryption key to the first software application instance.

3. The method according to claim 1, further comprising steps of:
    establishing a second shared encryption key with a second software application instance;
    creating a file containing the data encryption key;
    encrypting the file using the second shared encryption key; and
    storing the encrypted file in the data store.

4. The method according to claim 3, wherein the second software application instance runs on the second electronic device or a third electronic device.

5. The method according to claim 1, wherein said data is received from an application running on the electronic device or is received from an application running on a fourth electronic device communicatively connected to the first electronic device.

6. A method of controlling processing of data on an electronic device, the method comprising steps of:
    establishing a shared encryption key with the electronic device;
    sending a 'begin session' command to the electronic device, to cause the electronic device to create a storage location in a data store of the electronic device and obtain a data encryption key; and
    sending an 'end session' command to the electronic device, to cause the electronic device to discard the shared encryption key and delete the encrypted data from the storage location.

7. The method according to claim 6, further comprising steps of:
    sending a data request to the electronic device;
    receiving encrypted data from the electronic device; and
    decrypting the encrypted data using the shared encryption key.

8. The method according to claim 6, wherein the steps are performed by a first software application instance running on a second electronic device, and further comprising a second application instance performing steps of:
    establishing a second shared encryption key with the electronic device; and
    using the second shared encryption key to obtain access to a data encryption key on the electronic device.

9. The method according to claim 8, wherein the second application instance runs on the second electronic device or a third electronic device.

10. The method according to claim 6, wherein the electronic device is an Internet of Things device.

11. An electronic device comprising:
a memory; and
at least one hardware processor communicatively coupled with the memory and configured to:
establish a shared encryption key with a first software application instance running on a second electronic device;
receive a 'begin session' command sent by the first software application instance and responsive to the 'begin session' command:
create a storage location in a data store of the electronic device; and
obtain a data encryption key;
receive data;
encrypt the data using the data encryption key and store the encrypted data in the storage location;
receive an 'end session' command sent by the first software application instance and responsive to the 'end session' command:
discard the shared encryption key; and
delete the encrypted data from the storage location.

12. The device according to claim 11, further configured to:
receive a data request sent by the first software application instance;
decrypt the stored data using the data encryption key;
encrypt the data using the shared encryption key; and
send the data encrypted using the shared encryption key to the first software application instance.

13. The device according to claim 11, further configured to:
establish a second shared encryption key with a second software application instance;
create a file containing the data encryption key;
encrypt the file using the second shared encryption key; and
store the encrypted file in the data store.

14. The device according to claim 13, wherein the second software application instance runs on the second electronic device or a third electronic device.

15. The device according to claim 11, wherein said data is received from an application running on the electronic device or is received from an application running on a fourth electronic device communicatively connected to the first electronic device.

16. A non-transitory computer-readable storage medium having stored thereon, computer program which when executed by at least one processor of an electronic device is configured to
establish a shared encryption key with a first software application instance running on a second electronic device;
receive a 'begin session' command sent by the first software application instance and responsive to the 'begin session' command:
create a storage location in a data store of the electronic device; and
obtain a data encryption key;
receive data;
encrypt the data using the data encryption key and store the encrypted data in the storage location;
receive an 'end session' command sent by the first software application instance and responsive to the 'end session' command:
discard the shared encryption key; and
delete the encrypted data from the storage location.

* * * * *